(12) United States Patent
Desabhatla et al.

(10) Patent No.: US 10,205,414 B2
(45) Date of Patent: Feb. 12, 2019

(54) SYSTEMS AND METHODS FOR ADJUSTING OPERATIONS OF A GAS TURBINE FOLLOWING A TRANSIENT EVENT

(71) Applicant: General Electric Company, Schenectady, NY (US)

(72) Inventors: Sreedhar Desabhatla, Munich (DE); Scott William Szepek, Schenectady, NY (US); Alexis Sesmat, Belfort (FR); Maxime Buquet, Belfort (FR)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/163,451

(22) Filed: May 24, 2016

(65) Prior Publication Data
US 2017/0346430 A1 Nov. 30, 2017

(51) Int. Cl.
*H02P 9/04* (2006.01)
*H02J 3/00* (2006.01)
*H02J 3/24* (2006.01)
*H02K 7/18* (2006.01)
*H02P 101/00* (2015.01)

(52) U.S. Cl.
CPC .............. *H02P 9/04* (2013.01); *H02J 3/00* (2013.01); *H02J 3/24* (2013.01); *F05D 2220/762* (2013.01); *F05D 2270/05* (2013.01); *H02K 7/1823* (2013.01); *H02P 2101/00* (2015.01)

(58) Field of Classification Search
CPC ... H02P 9/04; H02K 7/1823; F05D 2220/762; F05D 2270/05

USPC ...................................................... 290/40 B
See application file for complete search history.

(56) References Cited

U.S. PATENT DOCUMENTS

| 4,302,715 A | 11/1981 | Putman et al. | |
|---|---|---|---|
| 6,216,437 B1* | 4/2001 | Hepner | F01D 17/04 60/39.27 |
| 8,946,916 B2* | 2/2015 | Tarnowski | F03D 7/0276 290/44 |
| 2004/0008010 A1* | 1/2004 | Ebrahim | H02P 9/04 322/44 |

(Continued)

FOREIGN PATENT DOCUMENTS

EP 2 897 283 A1 7/2015

OTHER PUBLICATIONS

Extended European Search Report and Opinion issued in connection with corresponding EP Application No. 17290070.6 dated Sep. 25, 2017.

*Primary Examiner* — Sean Gugger
(74) *Attorney, Agent, or Firm* — Fletcher Yoder, P.C.

(57) ABSTRACT

A method may involve monitoring a first set of electrical properties associated with an electrical grid configured to couple to a generator and determining whether a transient event is present on the electrical grid based on the first set of electrical properties. The method may also involve determining a mechanical power present on a shaft of the generator based on a second set of electrical properties associated with the generator, the electrical grid, or both when the transient event is present and sending the mechanical power to a controller associated with a turbine configured to couple to the generator, wherein the controller is configured to adjust one or more operations of the turbine based on the mechanical power.

19 Claims, 3 Drawing Sheets

(56) References Cited

U.S. PATENT DOCUMENTS

| | | | |
|---|---|---|---|
| 2007/0216164 A1* | 9/2007 | Rivas | F03D 7/0224 |
| | | | 290/44 |
| 2009/0218821 A1* | 9/2009 | ElKady | F01K 23/10 |
| | | | 290/52 |
| 2011/0115444 A1* | 5/2011 | Markunas | H02P 9/102 |
| | | | 322/19 |
| 2012/0175876 A1* | 7/2012 | Pendray | F02D 19/02 |
| | | | 290/41 |
| 2014/0001756 A1* | 1/2014 | Panosyan | H02K 49/046 |
| | | | 290/7 |
| 2014/0260293 A1* | 9/2014 | Chen | F02C 9/00 |
| | | | 60/773 |
| 2015/0061298 A1* | 3/2015 | Panosyan | H02P 9/04 |
| | | | 290/40 B |
| 2015/0097371 A1* | 4/2015 | Panosyan | F03D 7/0244 |
| | | | 290/7 |
| 2015/0377057 A1 | 12/2015 | Desabhatla | |

* cited by examiner

SYSTEMS AND METHODS FOR ADJUSTING OPERATIONS OF A GAS TURBINE FOLLOWING A TRANSIENT EVENT

BACKGROUND

The subject matter disclosed herein relates to control of a power generation system following a transient grid event. More specifically, the present disclosure relates to adjusting an operation of a gas turbine following the detection of a transient event on an electrical grid connected to the turbine.

A power generation system includes a prime mover that generates electrical power from other primary energy sources. An exemplary prime mover, a gas turbine, is a rotary mechanical device with a gas turbine shaft that drives an electrical generator to supply electrical power to a transmission grid. The transmission grid, in turn, supplies electricity to various power consumers. To ensure that the power generation system operates effectively, the turbine shaft speed and resulting grid frequency should be synchronized with each other within operational ranges. As such, when grid frequency changes abruptly due to a transient event, improved systems and methods for adjusting the turbine shaft speed in view of the transient event are desired.

BRIEF DESCRIPTION

Certain embodiments commensurate in scope with the originally claimed embodiments are summarized below. These embodiments are not intended to limit the scope of the claimed embodiments, but rather these embodiments are intended only to provide a brief summary of possible forms of the embodiments described herein. Indeed, the embodiments described within the claims may encompass a variety of forms that may be similar to or different from the embodiments set forth below.

In one embodiment, a system may include a turbine having a first controller configured to control one or more operations of the turbine. The system may also include a generator that may couple to the turbine, such that the generator may provide power to an electrical grid. The system may also include an exciter that may provide a direct current (DC) voltage and a DC current to a rotor of the generator. The exciter may also include a second controller that may monitor a first set of electrical properties associated with the electrical grid, determine whether a transient event is present on the electrical grid based on the first set of electrical properties, determine a mechanical power present on a shaft of the generator based on a second set of electrical properties associated with the generator, the electrical grid, or both when the transient event is present, and send the mechanical power to the first controller.

In another embodiment, a method may involve monitoring a first set of electrical properties associated with an electrical grid configured to couple to a generator and determining whether a transient event is present on the electrical grid based on the first set of electrical properties. The method may also involve determining a mechanical power present on a shaft of the generator based on a second set of electrical properties associated with the generator, the electrical grid, or both when the transient event is present and sending the mechanical power to a controller associated with a turbine configured to couple to the generator, wherein the controller is configured to adjust one or more operations of the turbine based on the mechanical power.

In yet another embodiment, a non-transitory computer readable medium may include computer-executable instructions that may cause a processor to monitor a first set of electrical properties associated with an electrical grid configured to couple to a generator, determine whether a transient event is present on the electrical grid based on the first set of electrical properties, determine a mechanical power present on a shaft of the generator based on a second set of electrical properties associated with the generator, the electrical grid, or both when the transient event is present, and send the mechanical power to a controller associated with a turbine configured to couple to the generator, wherein the controller is configured to adjust one or more operations of the turbine based on the mechanical power.

BRIEF DESCRIPTION OF THE DRAWINGS

These and other features, aspects, and advantages of the present embodiments described herein will become better understood when the following detailed description is read with reference to the accompanying drawings in which like characters represent like parts throughout the drawings, wherein.

DETAILED DESCRIPTION

Figure 1:
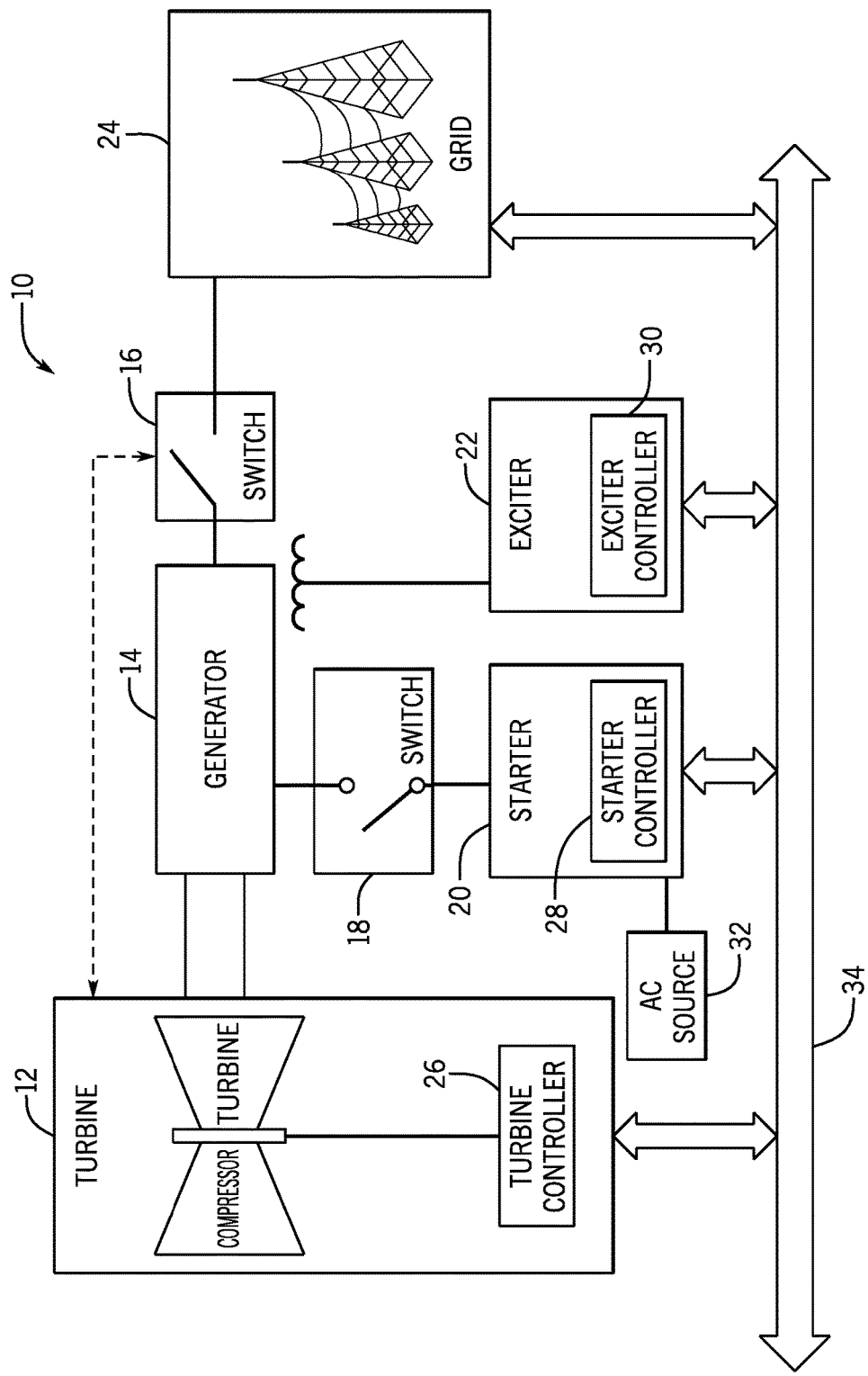
FIG. 1 illustrates a block diagram of a turbine-generator system, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

A power generation system may include a turbine and a generator. The turbine may have a prime mover (e.g., turbine shaft) that may provide mechanical energy to the generator, which may then output a voltage or electric potential to a grid. The turbine may include a turbine controller that may adjust a speed at which the turbine shaft may rotate. In one embodiment, the turbine controller may receive an indication that a transient event has occurred on the grid. The transient event may cause the frequency of the voltage output by the generator to deviate from its rated frequency. As such, when a transient event occurs, the generator may adjust its power output to synchronize with the frequency of the grid. However, when the turbine controller attempts to react to the same transient event, the turbine controller may not be able to adjust the speed of the turbine shaft within the same amount of time that the generator synchronizes its output with the grid. This mismatch of the speed of the turbine shaft and the frequency output of the generator may potentially affect the dynamic behavior of the turbine itself.

That is, as the frequency decreases, the speed at which the turbine shaft rotates also decreases. For example, when a frequency drop in the grid occurs, a drop in speed in which the turbine shaft rotates also decreases because the speed is directly proportional with the grid frequency. In this case, the fuel intake of the turbine would increase based on sensing the drop in speed, which increases active power output to compensate for the drop in frequency. This increase of fuel intake may or may not match the required change in electrical power over some period of time. As a result, the speed in which the turbine shaft rotates may decrease and eventually result in a trip. Consequently, the turbine controller may shut off of fuel to the turbine (e.g., flame out).

To provide enough time for prime mover to react, an exciter controller that controls the operation of the generator may detect or recognize the transient grid event at the initial stages of grid transient to its occurrence. Upon detecting the transient event, the exciter controller may send commands to the turbine controller to adjust the operation of the prime mover and compensate for the change in frequency of the generator. That is, the exciter controller may monitor electrical parameters, such as the power output and electrical frequency, of the generator and detect a transient event based on the electrical parameters. While a gas turbine is specifically discussed for explanatory purposes, the embodiments described herein apply to any prime mover and are not limited based on the exemplary system. Additional details regarding adjusting a load set point for a generator are provided below with reference to FIGS. 1-3.

By way of introduction, FIG. 1 illustrates a block diagram of a turbine-generator system 10. As shown in FIG. 1, the turbine-generator system 10 may include a turbine 12, a generator 14, a switch 16, a switch 18, a starter component 20, an exciter component 22, and an electrical grid 24. The turbine 12 may include any one or more turbines and may be configured as a simple cycle or a combined cycle. By way of example, the turbine 12 may include a gas turbine, a wind turbine, a steam turbine, a water turbine, or any combination thereof. In the turbine-generator system 10, the mechanical work output by the turbine 12 may rotate a shaft of the generator 14. In general, the generator 14 may then convert the rotation of the shaft into electrical energy that may be output to the electrical grid 24.

The starter component 20 may be a variable frequency drive, a load commutated inverter (LCI), or a similar type of electrical device that may output an alternating current (AC) voltage that may be provided to a stator of the generator 14. In one embodiment, the starter component 20 may receive an AC voltage from an AC voltage source 32 and may convert the AC voltage into the controlled AC voltage, which may be provided to the stator of the generator via the switch 18.

The exciter component 22 may include an electrical circuit that provides direct current (DC) current and a DC voltage to field windings of a rotor of the generator 14, thereby inducing a magnetic field within the generator 14. The magnetic field may then cause the rotor to spin inside the generator and rotate the shaft of the generator 14. In addition to creating the magnetic field within the generator 14, the exciter component 22 may be used to control the frequency, amplitude, and phase properties of the voltage output by the generator 14. As such, the exciter component 22 may be used to synchronize the voltage output by the generator 14 with the voltage of the electrical grid 24 after the generator's shaft rotates at its rated speed.

The turbine 12, the starter component 20, and the exciter component 22 may include a turbine controller 26, a starter controller 28, and an exciter controller 30, which may be used to control the turbine 12, the starter component 20, and the exciter component 22, respectively. The turbine controller 26, the starter controller 28, and the exciter controller 30 may each include a communication component, a processor, a memory, a storage, input/output (I/O) ports, and the like. The communication component may be a wireless or wired communication component that may facilitate communication between each component in the turbine-generator system 10, various sensors disposed about the turbine-generator system 10, and the like. The processor may be any type of computer processor or microprocessor capable of executing computer-executable code. The memory and the storage may be any suitable articles of manufacture that can serve as media to store processor-executable code, data, or the like. These articles of manufacture may represent non-transitory computer-readable media (i.e., any suitable form of memory or storage) that may store the processor-executable code used by the processor to, among other things, perform operations that may be used to control the turbine 12, the starter component 20, and the exciter component 22. The non-transitory computer-readable media merely indicates that the media is tangible and not a signal. The turbine controller 26, the starter controller 28, and the exciter controller 30 may communicate with each other via a communication network 34. The communication network 34 may include an Ethernet-based network, such as the Unit Data Highway (UDH) provided by General Electric.

Generally, the turbine 12 may rotate a shaft in the generator 14, such that the generator 14 outputs a voltage. The voltage output of the generator 14 may then be synchronized with the voltage of the electrical grid 24 and provided to the electrical grid 24 via the switch 16. In certain embodiments, the exciter controller 30 may monitor electrical properties of the grid 24. As such, the exciter controller 30 may monitor the grid 24 for transient events such as a rise or fall in grid frequency, a rise or fall in active power or reactive power of the generator 14, and the like. The transient event may include changes to electrical properties such as voltage, current, power, power factor, and the like.

Prior to the occurrence of a transient event and during a transient event, the exciter controller 30 may continuously determine an amount of mechanical power that is present on a shaft of the generator 14. That is, the exciter controller 30 may determine the amount of mechanical power present on the shaft of the generator 14 based on electrical data such as a terminal voltage output by the generator 14, a line current output by the generator 14, a power factor of the generator 14, a frequency/slip value, a shaft inertia value, and the like. During the transient event, the exciter controller 30 may determine the mechanical power present on the shaft of the generator 14 and send the determined mechanical power to the turbine controller 26 via the communication network 34 or the like.

Upon receiving the mechanical power from the exciter controller 34, the turbine controller 26 may adjust the operations of the turbine 12 to provide stability between the electrical properties of the grid 24 in view of the transient event and the rotation of the turbine shaft. As such, when the transient event occurs on the grid 24, the turbine controller 26 may adjust the rotation of the turbine shaft or compensate for the discrepancy between the rotation of the turbine shaft and the electrical properties of the grid 24 more quickly as compared to simply reacting to the transient event without the determined mechanical power.

Adjusting the rotation of the turbine shaft or, more generally, adjusting the operation of the turbine 12 may include modulating an air and fuel ratio used by the turbine 12 to rotate the turbine shaft, operating the turbine 12 in different Dry Low NOx (DLN) modes, adjusting fuel splints in various nozzles that are used for combustion in the turbine 12, and the like. Generally, by receiving the mechanical power on the shaft of the generator 14 during the transient event, the turbine controller 26 may continue the operation of the turbine 12 without causing instability in the combustion system of the turbine 12 or inducing compressor operation issues due to the transient event. That is, the turbine 12 may continue operating during the transient event such that operations of the turbine-generator system 10 may continue.

Figure 2:
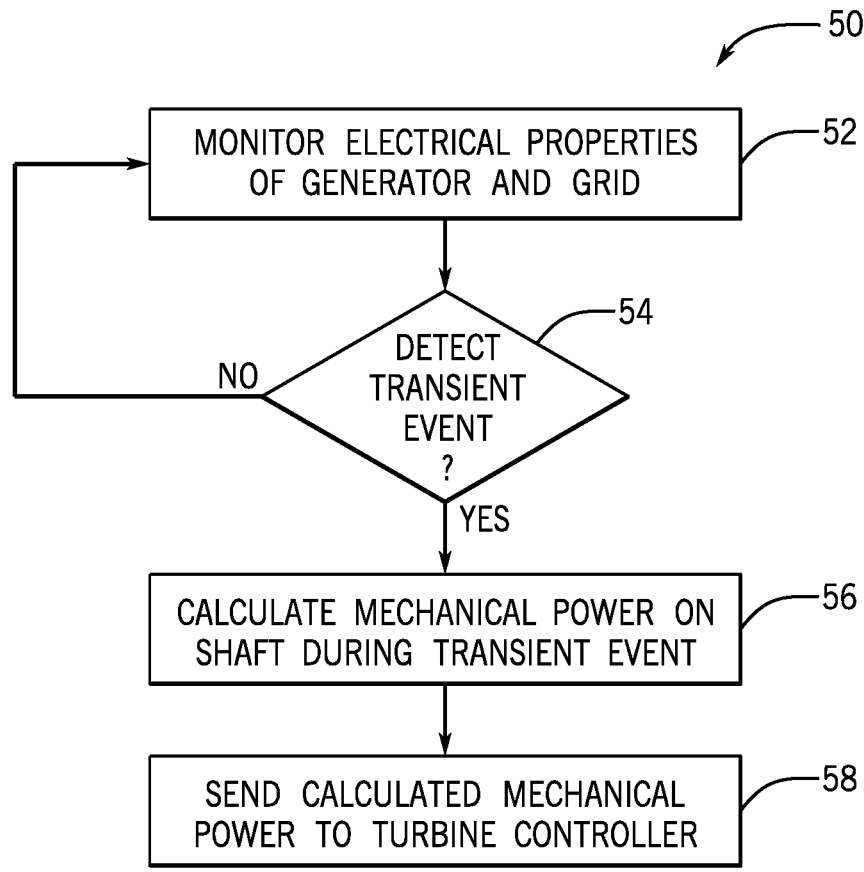
FIG. 2 illustrates a flow chart of a method for sending a calculated mechanical power of a shaft during a transient event to a turbine, in accordance with an embodiment.

With the foregoing in mind, FIG. 2 illustrates a flow chart of a method 50 for sending a calculated mechanical power of a shaft during a transient event to a turbine in accordance with an embodiment. Although the method 50 is described below as being performed by the exciter controller 30, it should be noted that the method 50 may be performed by any suitable processor. Moreover, although the following description of the method 50 is described in a particular order, it should be noted that the method 50 may be performed in any suitable order.

Referring now to FIG. 2, at block 52, the exciter controller 30 may monitor certain electrical properties associated with the grid 24, the generator 14, or both. The electrical properties may include a rise or fall in grid frequency, a rise or fall in active power or reactive power of the generator 14, voltage output by the generator 14 or the grid 24, current output by the generator 14 or the grid 24, power output by the generator 14 or the grid 24, power factor of the generator 14 or the grid 24, and the like. These electrical properties may be monitored using sensors such as voltage sensors, current sensors, and the like. Additionally, the exciter controller 30 may simulate the electrical properties based on data received from the sensors.

At block 54, the exciter controller 30 may determine whether a transient event is detected on the output of the generator 14 or the grid 24 based on the monitored electrical properties. In one embodiment, the exciter controller 30 may detect the presence of a transient event according to the procedure described in U.S. patent application Ser. No. 14/315,727. Alternatively, the exciter controller 30 may monitor the electrical properties and determine that a transient event is present when the electrical properties change more than some threshold within a certain period of time.

If the exciter controller 30 does not detect a transient event, the exciter controller 30 may return to block 52 and continue to monitor the electrical properties of the generator 14 and the grid 24. If, however, the exciter controller 30 detects the transient event, the exciter controller 30 may proceed to block 56.

At block 56, the exciter controller 30 may calculate the mechanical power on the shaft of the generator 14 during the transient event. In one embodiment, the exciter controller 30 may determine the mechanical power on the shaft of the generator 14 during the transient event according to the process flow diagram of FIG. 3. Generally, the process flow diagram of FIG. 3 may determine the mechanical power (Pm) present on the shaft of the generator 14 based on certain properties such as accelerating power (Pacc) of the rotor in the turbine 12, power output by the generator 14 (Pe), inertia (H) on the shaft, and the like. The accelerating power (Pacc) is determined according to Equation (1) provided below. The power output by the generator 14 (Pe) may be measured by excitation system via a sensor, potential transformer feedback, current transformer feedback, and the like. The inertia (H) may be determined using certain tests and physical properties of the shaft.

Figure 3:
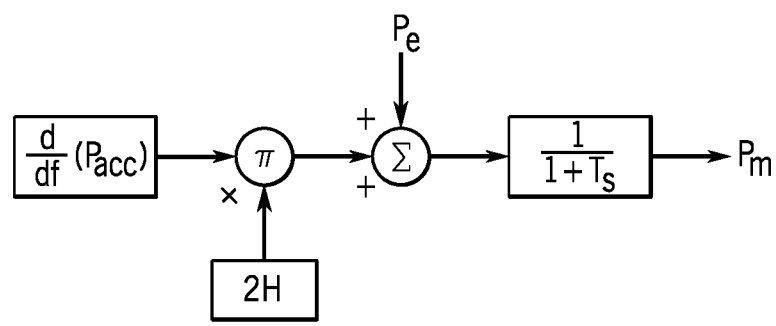
FIG. 3 illustrates a process flow for calculating a mechanical power of a shaft during a transient event, in accordance with an embodiment.

As shown in the process flow diagram of FIG. 3, the derivative of the accelerating power (Pacc) may be multiplied by two times the inertia (H). The accelerating power (Pacc) may be characterized according to Equation 1 below.

$$Pacc = \int \frac{Pacc}{H} dt = \int \frac{Pm - Pe}{H} dt \qquad (1)$$

As such, with the process flow diagram of FIG. 3 in mind, the mechanical power on the shaft of the generator 14 may be determined according to Equations (2) and (3) below.

$$Pm = \frac{d}{dt} Pacc \times 2H + Pe \qquad (2)$$

$$Pm = \frac{d}{dt}\left[\int \frac{Pm - Pe}{H} dt\right] \times 2H + Pe \qquad (3)$$

Referring back to FIG. 3, after calculating the mechanical power on the shaft during the transient event as described above, the exciter controller 30 may proceed to block 58. At block 58, the exciter controller 30 may send the calculated mechanical power to the turbine controller 26 via the communication network 34. Upon receiving the calculated mechanical power, the turbine controller 26 may update a model based control program that is being executed to control the operations of the turbine 12 using the calculated mechanical power.

Figure 4:
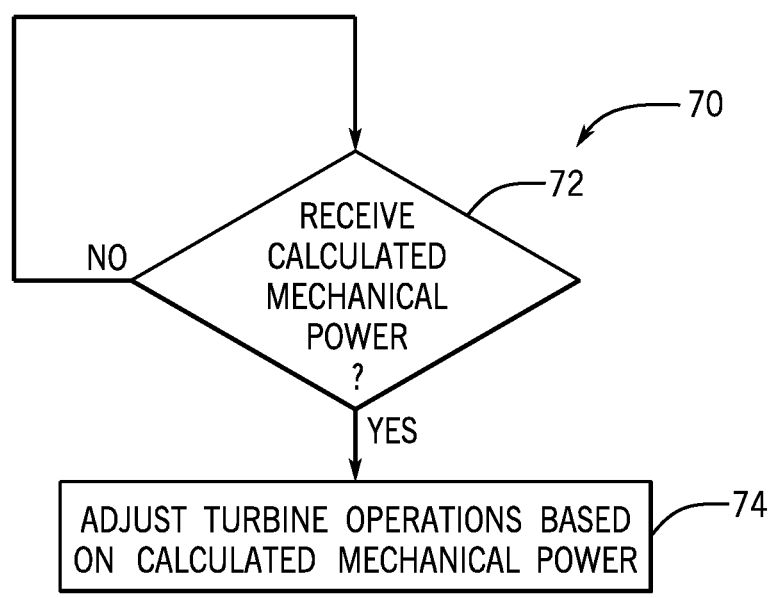
FIG. 4 illustrates a flow chart of a method for adjusting operations of a turbine during a transient event, in accordance with an embodiment.

With the foregoing in mind, FIG. 4 illustrates a method 70 for adjusting the operations of the turbine 12 based on a calculated mechanical power. Generally, the method 70 is described as being performed by the turbine controller 26, but it should be noted that any suitable processor capable of controlling operations of the turbine 12 may perform the method 70.

Referring to FIG. 4, at block 70, the turbine controller 26 may determine whether a calculated mechanical power of the shaft in the generator 14 was received from the exciter controller 30. If the turbine controller 26 has not received the calculated mechanical power, the turbine controller 26 may return to block 72 and continue to monitor whether it receives the calculated mechanical power.

If the turbine controller 26 receives the calculated mechanical power, the turbine controller 26 may proceed to block 74 and adjust the operations of the turbine 14 based on the calculated mechanical power. That is, the turbine controller 26 may use the calculated mechanical power to determine an air and fuel ratio used by the turbine 12 to rotate the turbine shaft to provide the calculated mechanical power on the shaft, a Dry Low NOx (DLN) mode to use to provide the calculated mechanical power on the shaft, a combination of fuel splints in various nozzles to for combustion in the turbine 12 to provide the calculated mechanical power on the shaft, and the like. It should be noted that Dry Low $NO_x$ (DLN) combustion systems may utilize fuel delivery systems that typically include multi-nozzle, premixed combustors. DLN combustor designs utilize lean premixed combustion to achieve low $NO_x$ emissions without using diluents such as water or steam. Lean premixed combustion involves premixing the fuel and air upstream of the combustor flame zone and operation near the lean flammability limit of the fuel to keep peak flame temperatures and $NO_x$ production low.

Technical effects of the embodiments in the present disclosure include improving stability and effectiveness of the turbine-generator system 10 in light of transient events. That is, the operations of the turbine-generator system 10 may continue to be functional by performing the method described herein after the occurrence of a transient event. As a result, the turbine-generator system 10 may operate continuously and prevent the loss of power from the turbine-generator 10.

This written description uses examples to disclose embodiments described herein, including the best mode, and also to enable any person skilled in the art to practice the embodiments described herein, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a turbine comprising a first controller configured to control one or more operations of the turbine;
a generator configured to couple to the turbine, wherein the generator is configured to provide power to an electrical grid;
an exciter configured to provide a direct current (DC) voltage and a DC current to a rotor of the generator, wherein the exciter comprises a second controller configured to:
monitor a first set of electrical properties associated with the electrical grid;
determine whether a transient event is present on the electrical grid based on the first set of electrical properties;
determine a mechanical power present on a shaft of the generator based on a second set of electrical properties associated with the generator, the electrical grid, or both in response to the transient event being present, wherein the second set of electrical properties comprises a power output by the generator and an accelerating power associated with the rotor of the turbine, and wherein the mechanical power comprises an indication of energy used to rotate the shaft; and
send the mechanical power to the first controller, wherein the first controller is configured to adjust the one or more operations to provide stability between the first set of electrical properties and a rotation of the shaft, based on the mechanical power.

2. The system of claim 1, wherein the first controller is configured to adjust the one or more operations of the turbine based on the mechanical power.

3. The system of claim 1, wherein the one or more operations comprise air and fuel ratio of the turbine, a Dry Low NOx (DLN) mode of the turbine, an operation of one or more nozzles used for combustion within the turbine, or any combination thereof.

4. The system of claim 1, wherein the first set of electrical properties comprise a frequency associated with the electrical grid, active power associated with the generator, reactive power associated with the generator, voltage associated with the electrical grid, current associated with the electrical grid, power associated with the electrical grid, a power factor associated with the electrical grid, or any combination thereof.

5. The system of claim 1, wherein the second set of electrical properties comprises an inertia on the shaft in the generator.

6. The system of claim 1, wherein the second controller is configured to determine the mechanical power according to:

$$Pm = \frac{d}{dt}\left[\int \frac{Pm - Pe}{H} dt\right] \times 2H + Pe$$

wherein Pm is the mechanical power, H is inertia on the shaft, and Pe is a power output by the generator.

7. The system of claim 1, wherein the second controller determines that the transient event is present on the electrical grid when a frequency, voltage, current, power, or power factor associated with the electrical grid increases or decreases more than a threshold.

8. The system of claim 1, wherein the second controller sends the mechanical power to the first controller via a communication network.

9. A method, comprising:
monitoring a first set of electrical properties associated with an electrical grid configured to couple to a generator;
determining whether a transient event is present on the electrical grid based on the first set of electrical properties;
determining a mechanical power present on a shaft in the generator based on a second set of electrical properties associated with the generator in response to the transient event being present, wherein the second set of electrical properties comprises an inertia on the shaft in the generator, an accelerating power associated with a rotor of a turbine, and a power output by the generator, and wherein the mechanical power comprises an indication of energy used to rotate the shaft; and
sending the mechanical power to a controller associated with the turbine configured to couple to the generator, wherein the controller is configured to adjust one or more operations of the turbine based on the mechanical power.

10. The method of claim 9, wherein the one or more operations comprise air and fuel ratio of the turbine, a Dry Low NOx (DLN) mode of the turbine, an operation of one or more nozzles used for combustion within the turbine, or any combination thereof.

11. The method of claim 9, wherein the first set of electrical properties comprise a frequency associated with the electrical grid, active power associated with the generator, reactive power associated with the generator, voltage associated with the electrical grid, current associated with the electrical grid, power associated with the electrical grid, a power factor associated with the electrical grid, or any combination thereof.

12. The method of claim 9, wherein the mechanical power is determined according to:

$$Pm = \frac{d}{dt}\left[\int \frac{Pm - Pe}{H} dt\right] \times 2H + Pe$$

wherein Pm is the mechanical power, H is the inertia on the shaft, and Pe is the power output by the generator.

13. The method of claim 9, wherein the transient event is determined to be present on the electrical grid when a frequency, voltage, current, power, or power factor associated with the electrical grid increases or decreases more than a threshold.

14. A non-transitory computer readable medium comprising computer-executable instructions configured to cause a processor to:
monitor a first set of electrical properties associated with an electrical grid configured to couple to a generator;
determine whether a transient event is present on the electrical grid based on the first set of electrical properties;
determine a mechanical power present on a shaft of the generator based on a second set of electrical properties associated with the generator, the electrical grid, or both when the transient event is present, wherein the second set of electrical properties comprises a power output of the generator and an accelerating power associated with a rotor of a turbine, wherein the mechanical power comprises an indication of energy used to rotate the shaft; and
send the mechanical power to a controller associated with the turbine configured to couple to the generator, wherein the controller is configured to adjust one or more operations of the turbine based on the mechanical power, wherein the one or more operations of the turbine comprise a Dry Low NOx (DLN) mode of the turbine.

15. The non-transitory computer readable medium of claim 14, wherein the one or more operations comprise air and fuel ratio of the turbine, an operation of one or more nozzles used for combustion within the turbine, or any combination thereof.

16. The non-transitory computer readable medium of claim 14, wherein the first set of electrical properties comprise a frequency associated with the electrical grid, active power associated with the generator, reactive power associated with the generator, voltage associated with the electrical grid, current associated with the electrical grid, power associated with the electrical grid, a power factor associated with the electrical grid, or any combination thereof.

17. The non-transitory computer readable medium of claim 14, wherein the second set of electrical properties comprises an inertia on the shaft in the generator.

18. The non-transitory computer readable medium of claim 14, wherein the mechanical power is determined according to:

$$Pm = \frac{d}{dt}\left[\int \frac{Pm - Pe}{H} dt\right] \times 2H + Pe$$

wherein Pm is the mechanical power, H is inertia on the shaft, and Pe is a power output by the generator.

19. The non-transitory computer readable medium of claim 14, wherein the transient event is determined to be present on the electrical grid when a frequency, voltage, current, power, or power factor associated with the electrical grid increases or decreases more than a threshold.

* * * * *